2 Sheets—Sheet 1.
G. B. WIESTLING.
Dumping-Cart.
No. 222,557. Patented Dec. 9, 1879.
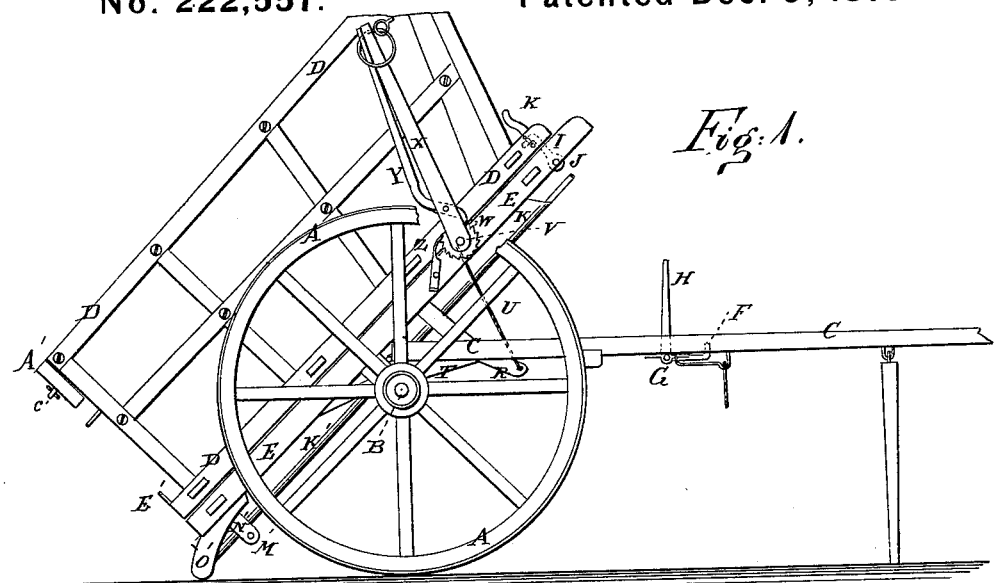
Fig. 1.
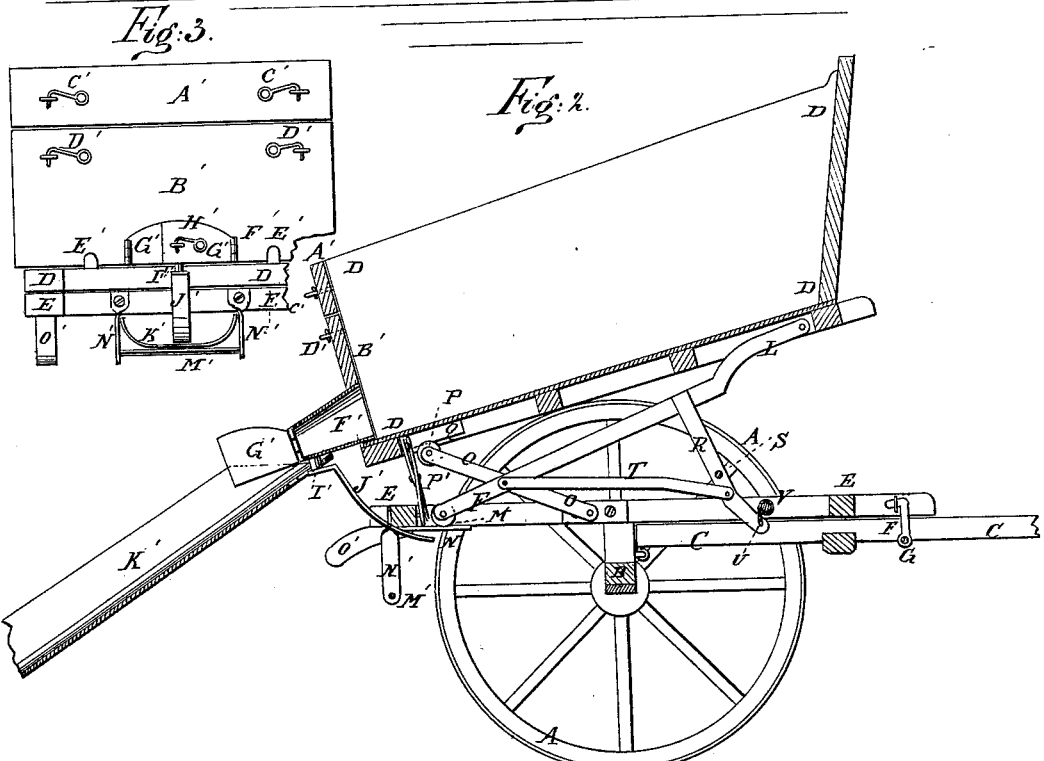
Fig. 3.
Fig. 2.
WITNESSES:
Chas. Nista.
C. Sedgwick
INVENTOR:
G. B. Wiestling
BY Munn & Co.
ATTORNEYS.

G. B. WIESTLING.
Dumping-Cart.

No. 222,557. Patented Dec. 9, 1879.

UNITED STATES PATENT OFFICE.

GEORGE B. WIESTLING, OF MONT ALTO, PENNSYLVANIA.

IMPROVEMENT IN DUMPING-CARTS.

Specification forming part of Letters Patent No. 222,557, dated December 9, 1879; application filed October 27, 1879.

*To all whom it may concern:*

Be it known that I, GEORGE B. WIESTLING, of Mont Alto, in the county of Franklin and State of Pennsylvania, have invented a new and useful Improvement in Dumping Carts, Wagons, and Cars, of which the following is a specification.

Figure 4:
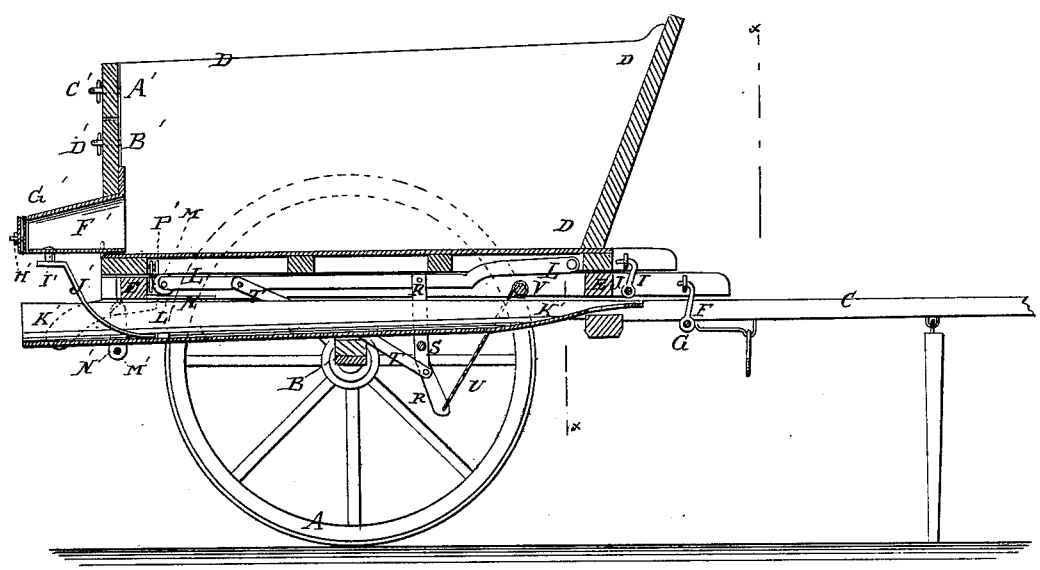
Figure 5:
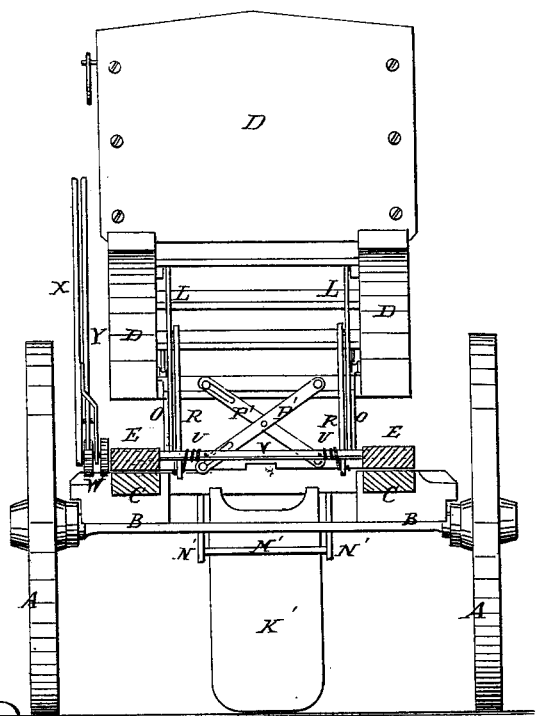

Figure 1, Sheet 1, is a side elevation of my improvement, shown in position for dumping. Fig. 2, Sheet 1, is a sectional side elevation, shown with the body raised for dumping. Fig. 3, Sheet 1, is a rear elevation of the vehicle-body. Fig. 4, Sheet 2, is a sectional side elevation. Fig. 5, Sheet 2, is a sectional front elevation taken through the line $x\ x$, Fig. 4.

Similar letters of reference indicate corresponding parts.

The object of this invention is to furnish carts, wagons, cars, and other vehicles so constructed that their bodies may be raised vertically, and also set in inclined positions, to facilitate the dumping of their contents.

The invention consists in providing a vehicle with an arrangement of pivoted bars and a power mechanism, whereby the body of the vehicle may be raised vertically and at the same time inclined into a suitable dumping position; also, in providing the vehicle with an arrangement of pivoted brace-bars, whereby the body of the vehicle will be held steady when raised; and, also, in the combination, with the discharge-spout and chute, of a curved arm for holding the chute in place, as will be hereinafter fully described.

I will describe my improvement as applied to a cart, but do not limit myself to that application, as it may be applied with equal advantage to wagons, cars, and other vehicles.

A represents the wheels, B the axle, and C the shafts, of a cart, about the construction of which parts there is nothing new.

D is the cart-body, the base-frame of which rests upon a frame, E, hinged to the axle B, so that the cart may be dumped in the usual way, the frame E and cart-body D moving together; or the frame E may be rigidly connected with the axle B, and the cart-body D dumped by means of my improvement. When the frame E is hinged to the axle B the forward end of the said frame E is secured to the shafts C by hooks F, rigidly attached to a shaft, G, which works in bearings attached to the shafts C, and has a lever, H, attached to one of its ends for convenience in operating the hooks F. The forward end of the body D is secured to the forward end of the frame E by hooks I, rigidly attached to a shaft, J, which works in bearings attached to the frame E. To the shaft J, or to one of the hooks I, is attached, or upon it is formed, a handle, K, for convenience in operating the said hooks I.

To the forward corners of the base-frame of the body D are pivoted the forward ends of two bars, L, the rear ends of which, or pulleys M, pivoted to the said rear ends, rest upon the rear part of the frame E, or upon supporting-plates N, attached to the said frame E. To the rear parts of the bars L are pivoted two short bars, O, the forward ends of which are pivoted to the frame E at or near the axle B. The rear ends of the bars O or pulleys P, pivoted to the said rear ends, rest against the rear part of the base-frame of the body D, or against plates Q, attached to the said base-frame. To the forward parts of the bars L are rigidly attached the upper ends of two downwardly-projecting arms, R, which are connected by a cross-rod, S, and are strengthened by braces T. The forward ends of the braces T are attached to the lower parts of the arms R, and their rear ends are secured to the rear parts of the bars L by the bolts that pivot the bars L and O to each other.

To the lower ends of the arms R are attached the ends of ropes or chains U, the other ends of which are attached to the shaft V. The shaft V revolves in bearings formed in or attached to the frame E, and to one of its ends is attached a ratchet-wheel, W.

To the same end of the shaft V is pivoted the end of a lever, X, to which is pivoted a lever-pawl, Y, to engage with the teeth of the ratchet-wheel W, so that the shaft V may be turned to wind up the ropes or chains U by operating the lever X.

To the frame E is pivoted a pawl, Z, to engage with the ratchet W and hold the shaft V from turning back while the lever and pawl X Y are being shifted for another stroke. With this construction, when the ropes or chains U are wound upon the shaft V, the forward ends of the bars L will be raised, causing the bars L O to act as lazy-tongs and raise the cart-body D vertically, the forward end of the said cart-body rising more rapidly than the rear end, and thus giving the cart-body, when raised, such an inclination that the load will slide out when the tail-board or discharge-spout is opened.

The cart-body D is kept from lateral movement and is held steady when elevated by the bars P', which are pivoted to each other at or near their centers. The alternate ends of the bars P' are pivoted to the base-frame of the body D and the frame E. The bars P' are slotted at one end to receive the pivoting-bolts, as shown in Fig. 5, so that they can open in the manner of lazy-tongs when the body D is raised and keep the said body steady during its entire movement. The brace-bars P' may be applied to any desired part of the frame-work; but I prefer to apply them at the rear end, as shown in Fig. 2.

The tail-board is made in two parts, the narrow upper part, A', being designed to hold the side-boards of the cart-body D against the outward pressure of the load when the wider lower part, B', is detached. The narrow upper part, A', is secured in place by hooks and staples C'. The wider lower part, B', is secured in place by hooks and staples D' and by lugs E', attached to the bottom of the cart-body D.

In the lower part, B', of the tail-board, near its lower edge, is secured a short outwardly-projecting discharge-spout, F', the outer end of which is closed by two doors, G'. The outer ends of the doors G' are hinged to the rear edges of the sides of the spout F'. The inner ends of the doors G' overlap each other, and are secured by hooks and staples H'.

To the lower side of the outer part of the spout F' is attached a short stud, I', to the lower end of which is attached the outer end of the curved arm J'. The lower end of the curved arm J' rests upon the upper side of the bottom of the chute K' and against a pin or projection, L', attached to the said bottom, when the said chute is in position for carriage, to keep the chute in place. When the chute K' is being carried its middle part rests in a concavity in the axle B, its forward end rests upon the cross-bar of the shaft C, and its rear end rests upon a roller, M', the ends of which are pivoted to the lower ends of hangers N', attached to the rear end of the frame E. As the chute K' is drawn out for use the end of the curved arm J' passes through a short slot in the forward part of the bottom of the chute K', and the said chute K' slides up the said curved arm J' to the stud I', where it is supported in place while being used by the upper end of the said curved arm J'.

To the rear corners of the frame E are attached arms O', to strike against the ground and protect the discharge-spout F' when the cart is dumped in the ordinary way.

Having thus described my invention, I claim as new and desire to secure by Letters Patent—

1. The combination, with body D and frame E, of the pivoted frame L R S T, the short bars O, pivoted to said frame, the ropes U, the shaft V, and the lever X, as shown and described.

2. The arm J', attached to the stud I' of spout F', in combination with and resting at its lower end upon the upper side of the bottom of chute K', and against pin L' when the chute is not in use, as and for the purpose specified.

3. In a dumping-vehicle, the combination, with the frame D of the body and the frame E of the gearing, of one or more pairs of pivoted brace-bars, P', substantially as herein shown and described, for holding the body D steady when raised, as set forth.

4. In a dumping-vehicle, the combination, with the body D, the gearing-frame E, and the pivoted elevating-bars L O, of the arms R, the ropes or chains U, the shaft V, and its operating mechanism, substantially as herein shown and described, for applying power to the elevating-bars L O, as set forth.

GEO. B. WIESTLING.

Witnesses:
WILSON REYNOLDS,
GEO. BARRETT.